United States Patent [19]
Zweighaft

[11] Patent Number: 5,426,355
[45] Date of Patent: Jun. 20, 1995

[54] POWER-OFF MOTOR DECELERATION CONTROL SYSTEM

[75] Inventor: James Zweighaft, Boulder, Colo.

[73] Assignee: Exabyte Corporation, Boulder, Colo.

[21] Appl. No.: 150,727

[22] Filed: Nov. 12, 1993

[51] Int. Cl.[6] ............................................. H02P 7/01
[52] U.S. Cl. ...................... 318/364; 318/64;
318/478; 318/376; 388/847; 388/904;
388/907.5; 360/71; 360/74.1; 360/90
[58] Field of Search ............... 360/75, 69, 104–105;
318/563, 560–562, 565–567, 590–591, 615, 626,
685, 687, 135, 139, 156, 434, 445–446, 449, 466,
476, 478, 254, 138, 375, 439, 376, 362, 364, 53,
59–64; 361/33, 23, 91, 111, 53–57; 363/50–58;
323/220, 223–226, 229–231, 265–266, 273–276,
282–285, 279, 303, 311; 388/842–847, 903, 904,
901.5

[56] References Cited
U.S. PATENT DOCUMENTS

| | | | |
|---|---|---|---|
| 4,125,881 | 11/1978 | Eige et al. | 360/77.13 |
| 4,237,501 | 12/1980 | Barmache et al. | 360/75 |
| 4,481,449 | 11/1984 | Rodal | 318/375 |
| 4,786,995 | 11/1988 | Stupeck et al. | 360/75 |
| 4,831,469 | 5/1989 | Hanson et al. | 360/75 |
| 4,835,628 | 5/1989 | Hinz et al. | 360/48 |
| 4,843,495 | 6/1989 | Georgis et al. | 560/77.15 |
| 5,065,261 | 11/1991 | Hughes et al. | 360/70 |
| 5,068,757 | 11/1991 | Hughes et al. | 360/77.13 |
| 5,091,680 | 2/1992 | Palm | 318/368 |
| 5,142,422 | 8/1992 | Zook et al. | 360/54 |
| 5,191,491 | 3/1993 | Zweighaft | 360/50 |

Primary Examiner—David S. Martin
Attorney, Agent, or Firm—Nixon & Vanderhye

[57] ABSTRACT

A system (20) for controlling deceleration of a motor (22) during an abrupt power-off condition includes a processor (40), a motor control circuit (50), and a secondary power source (70). During normal power-on operation and based on currently prevailing operation parameters, processor (40) routinely generates a contingent motor-governing deceleration signal for potential use in governing motor (22) should the power-off condition occur. In response to the occurrence of a power-off condition, motor control circuit (50) controls motor (22) in accordance with the contingent motor-governing deceleration signal to achieve orderly deceleration. Secondary power supply circuit (70) provides power to motor control circuit (50) during the power-off condition.

43 Claims, 7 Drawing Sheets

POWER-OFF MOTOR DECELERATION CONTROL SYSTEM

BACKGROUND

1. Field of Invention

This invention pertains to controlled deceleration of a media handling mechanism during a power off condition, such as controlled deceleration of reels containing a media such as an information storage media.

2. Related Art and Other Considerations

Power-driven motors are often employed in the transport of media from a point of media supply to a point of media take-up. Such motors typically have media handling elements mounted to a drive shaft of the motor. One example of a media handling element is a reel about which the media is either wound or unwound. Abrupt termination of power to such motors during media transport can reak havoc unless deceleration of the transported media is controlled.

To the extent that prior art devices provide deceleration control, such control is generally implemented through mechanical braking of the media. Mechanical braking schemes consequentially involve additional mechanical components and are frequently ineffective.

To accurately control deceleration of media being fed to or taken up by a reel, numerous complex factors must be considered. Such factors include, at a minimum, the instantaneous speed of the media as well as the instantaneous radius of the media on the reel.

Unless such factors are properly considered, the media can experience inordinate tension during braking, which leads to media damage. In some instances, inaccurate braking (or no braking at all) may lead to erratic spooling of the media about the reel or even tape dumping. Erratic spooling and dumping typically require manual corrective intervention (with attendant delay) and, in aggravated cases, media damage.

Consideration of such factors would entail computation ability. However, during an abrupt power-off condition, the normal power supply is not available for powering any computational intelligence.

One example of a device for which controlled deceleration of media is paramount is a computer peripheral device known as a tape drive. A tape drive typically has magnetic recording tape extending between a tape supply reel and a tape take-up reel. Should power be disrupted to motors which actuate either reel, the foregoing problems can be experienced. In view of the sensitivity and delicacy of magnetic tape, and its importance for storing information, tape damage and tape mishandling cannot be tolerated.

One particular type of tape drive is a helical scan tape drive. Examples of helical scan tape drives are shown, inter alia, in the following US patents (all of which are incorporated herein by reference):

U.S. Pat. No. 4,835,628 to Hinz et al.
U.S. Pat. No. 4,843,495 to Georgis et al.
U.S. Pat. No. 5,065,261 to Hughes et al.
U.S. Pat. No. 5,068,757 to Hughes et al.
U.S. Pat. No. 5,142,422 to Zook et al.

SUMMARY

A system for controlling deceleration of a motor during an abrupt power-off condition includes a processor, a motor control circuit, and a secondary power source. During normal power-on operation and based on currently prevailing operation parameters, the processor routinely generates a contingent motor-governing deceleration signal for potential use in governing the motor should the power-off condition occur. In response to the occurrence of a power-off condition, the motor control circuit controls the motor in accordance with the contingent motor-governing deceleration signal to achieve orderly deceleration. The secondary power supply circuit provides power to the motor control circuit during the power-off condition.

In one embodiment, the motor is a brushless three phase DC motor having a coil drive circuit for each of three coils of the motor. Each coil drive circuit comprises a pair of transistors and a pair of diodes. The secondary power supply circuit is a regenerative power supply circuit which uses current from the decelerating motor to provide power to the motor control circuit during the power-off condition. In particular, the regenerative power supply circuit comprises the coil drive circuits and a bypass capacitor, the bypass capacitor being connected between a power supply and each coil drive circuit.

The processor also generates a normal motor-governing control signal for governing the motor during normal power-on operation. The motor control circuit includes a controller which, in accordance with whether a power-off or power-on condition is experienced, selects between (1) the normal condition motor-governing control signal and (2) the contingent motor-governing deceleration signal. The contingent motor-governing deceleration signal is stored in a memory by the processor for access by the controller.

In one embodiment, the processor generates the contingent motor-governing deceleration signal by consulting a look-up table stored in a memory. In another embodiment, the processor generates the contingent motor-governing deceleration signal by performing a calculation using current operation parameters.

One field of application for the motor deceleration control system of the present invention is a motor for a tape reel in a magnetic tape drive.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
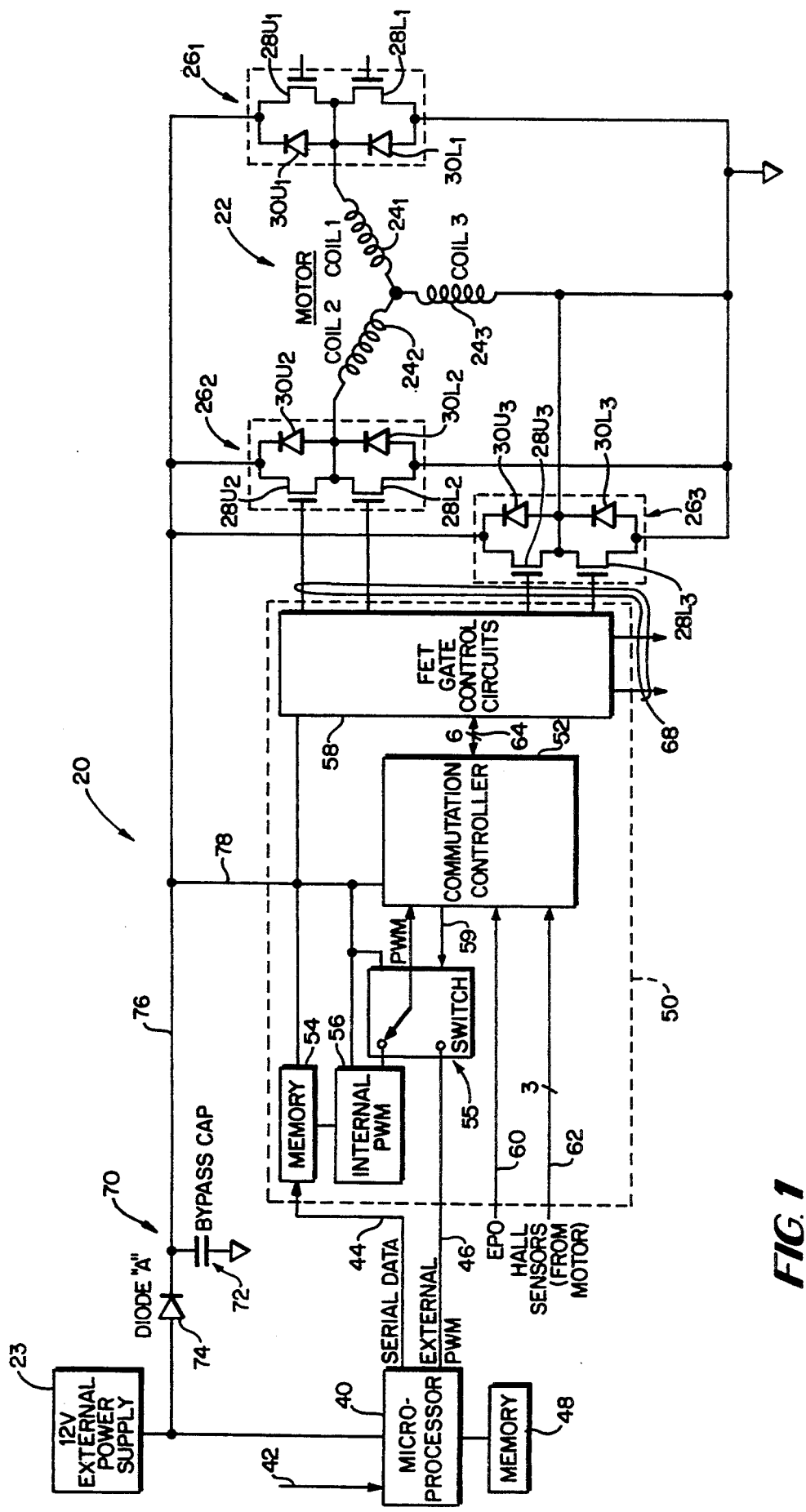
FIG. 1 is a schematic view of a deceleration control system according to an embodiment of the invention.

FIG. 1 shows a deceleration control system 20 for a motor 22. Motor 22 can be employed for any of innumerable purposes. During normal conditions, motor 22 is powered by a external power supply 23 (such as a 12 volt source).

In the particular embodiment shown in FIG. 1, motor 22 is a three phase brushless DC motor having three coils $24_1$, $24_2$, and $24_3$. For each coil $24_1$, $24_2$, and $24_3$ there is provided a respective coil drive circuit $26_1$, $26_2$, and $26_3$. Each coil drive circuit 26 is connected between external power supply 23 and ground. Further, each coil drive circuit includes a pair of FET transistors 28U and 28L, as well as the FET's corresponding intrinsic diodes 30U and 30L. In each coil drive circuit 26, the transistor 28U and diode 30U are connected in parallel between the coil 24 and external power supply 23; transistor 28L and diode 30L are connected in parallel between the coil 24 and ground. Although not shown in FIG. 1, motor 22 is typically provided with a sensor (such as a Hall sensor) for each coil 24.

Deceleration control system 20 includes a microprocessor 40 which is powered by external power supply 23. Microprocessor 40 receives on input bus 42 signals indicative of one or more currently prevailing operating parameters of the overall system in which motor 20 operates. Microprocessor 40 has a serial data output port to which serial line 44 is connected; as well as a port to which a pulse width modulation (PWM) line 46 is connected. As explained in more detail below, microprocessor 40 routinely outputs a contingent motor-governing deceleration signal on serial line 44 and outputs a normal motor-governing PWM control signal on line 46. Microprocessor 40 is also connected to access a memory (such as read only memory [ROM] 48) wherein (in one embodiment) table look-up information is stored.

Deceleration control system 20 also includes a motor control circuit 50. Motor control circuit 50 includes a controller 52; a memory 54; a switch 55; PWM conversion circuit 56; and gate control circuitry 58 (for controlling gates of each of the transistors 28).

As shown in FIG. 1, an input port of memory 54 is connected to serial data line 44 for reception of the contingent motor-governing deceleration signal. An output port of memory 54 is connected to an input port of PWM conversion circuit 56. The PWM conversion circuit 56, in conventional manner, creates a PWM output signal, hereinafter known as the contingent motor-governing PWM signal, from the value stored in memory 54.

An output port of PWM conversion circuit 56 (at which the contingent motor-governing PWM output signal is applied) is connected to a first input terminal of switch 55. A second input terminal of switch 55 is connected to microprocessor 40 via pulse width modulation (PWM) line 46 for receipt of the normal motor-governing PWM control signal. An output terminal of switch 55 is connected to a PWM input terminal of controller 52. Controller 52 has a switch control output terminal which is connected by switch control line 59 to switch 55 for controlling actuation of switch 55 (i.e., whether the output terminal of switch 55 is connected to receive either the contingent motor-governing PWM output signal or the normal motor-governing PWM control signal).

Controller 52 is also connected to receive on line 60 a signal which indicates when a power-off condition has occurred (i.e., when power is interrupted from power supply 23). Upon occurrence of power-off, for example, controller 52 may detect that the signal on line 60 has gone to a low value. Controller 52, being powered during the power-off condition in the manner hereinafter described, generates an appropriate signal value on switch control line 59 to control switch 55 in the manner aforedescribed.

Controller 52 is further connected to receive input signals on bus 62 from the unillustrated Hall sensors associated with each of the three coils 24 of motor 22. A data output port of controller 52 is connected by a six bit bus 64 to the gate control circuitry 58 which contols gates of each of the transistors 28. Gate control circuitry 58 has six gate driving output lines 68, with a separate gate driving output line for the gate of each transistor 28.

Deceleration control system 20 further includes a secondary or regenerative power supply circuit 70 which provides power to the motor control circuit during the power-off condition. As explained hereinafter, regenerative power supply circuit 70 uses current from the decelerating motor 22 to provide power to the motor control circuit 50 during the power-off condition. In the embodiment illustrated in FIG. 1, regenerative power supply circuit 70 comprises the coil drive circuits 26; a bypass capacitor 72; and a diode 74 (which, in the illustrated embodiment, is a Schottky diode). Bypass capacitor 72 is connected on a power supply line 76 between external power supply 23 and each of the coil drive circuits 26; diode 74 is connected between bypass capacitor 72 and external power supply 23. Regenerative power supply circuit 70 provides power on power supply line 76 and power supply branch line 78 to each electrical component of motor control circuit 50, including controller 52, memory 54, PWM converter 56, switch 55, and gate control circuitry 58.

The precise internal configuration of controller 52 and gate control circuitry 58 are not illustrated herein. Controller 52, in accordance with conventional commutation processes, essentially uses pulse width modulated input signals and signals from the Hall sensors associated with coils 24 of motor 22 for generating appropriate signals for the gate control circuitry 58, all in a manner understood by the person skilled in the art of driving three phase motors. In this regard, and as is well known, signals from the Hall sensors are utilized to determine which two motor coils 24 are to be driven at any given time.

Further, it will be understood by the man skilled in the art how the controller 52 selects between two PWM input signals (e.g., the normal motor-governing PWM control signal and the contingent motor-governing PWM output signal) in accordance with a value of the signal on line 60. Similarly, given the herein-specified outputs and operation of gate control circuitry 58, the man skilled understands how to generate signals for controlling gates of the transistors 28 without detailed description herein. Other advantageous uses and outputs of control circuit 50 are shown in simultaneously-filed U.S. patent application Ser. No. 08/150,731 of Zweighaft and Bauman, entitled "High Performance Power Amplifier" (incorporated herein by reference).

OPERATION: NORMAL POWER-ON MODE

Figure 2A:
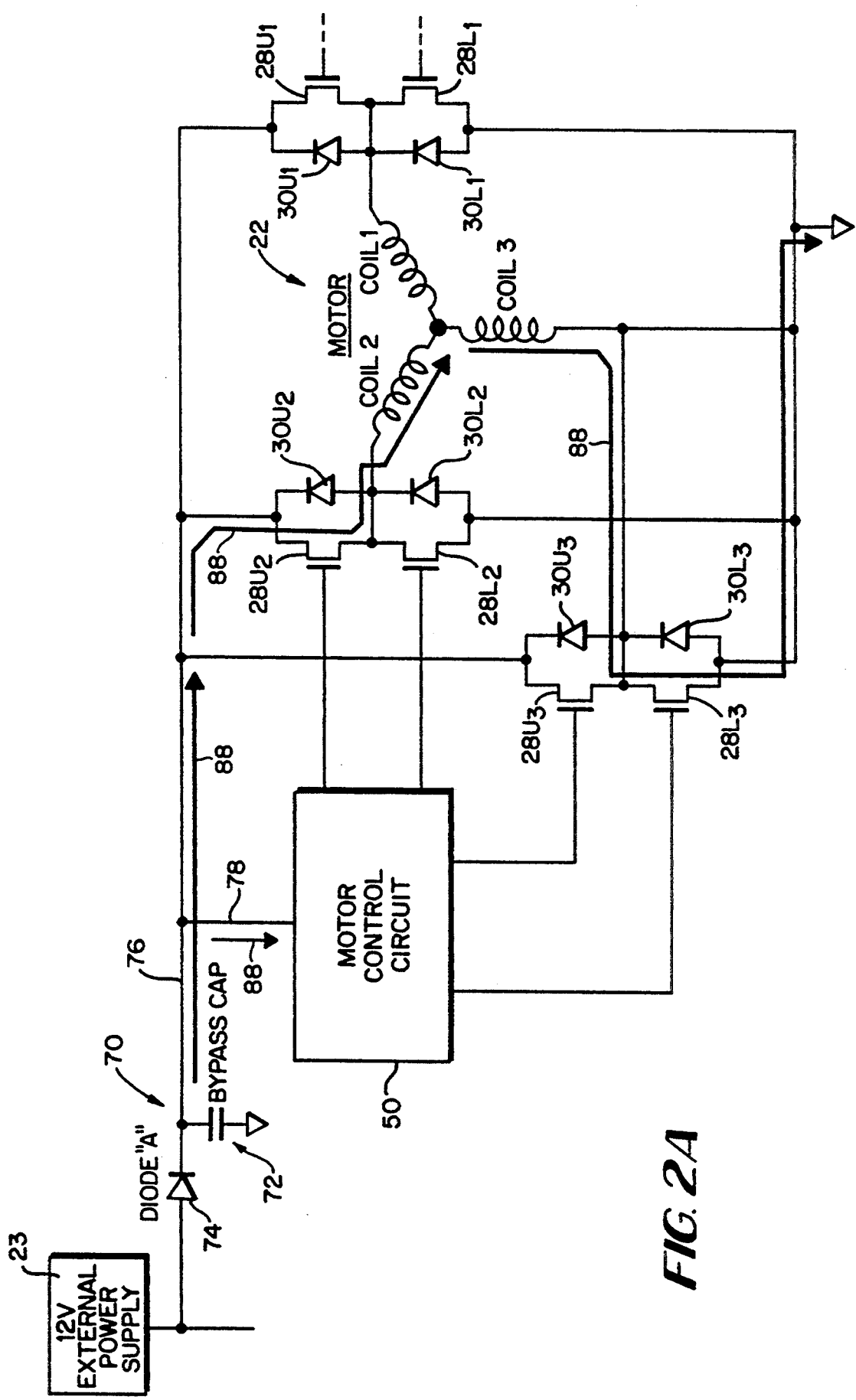
FIG. 2A is schematic view showing current build-up in the deceleration control system of FIG. 1 during a normal operation mode.
Figure 2B:
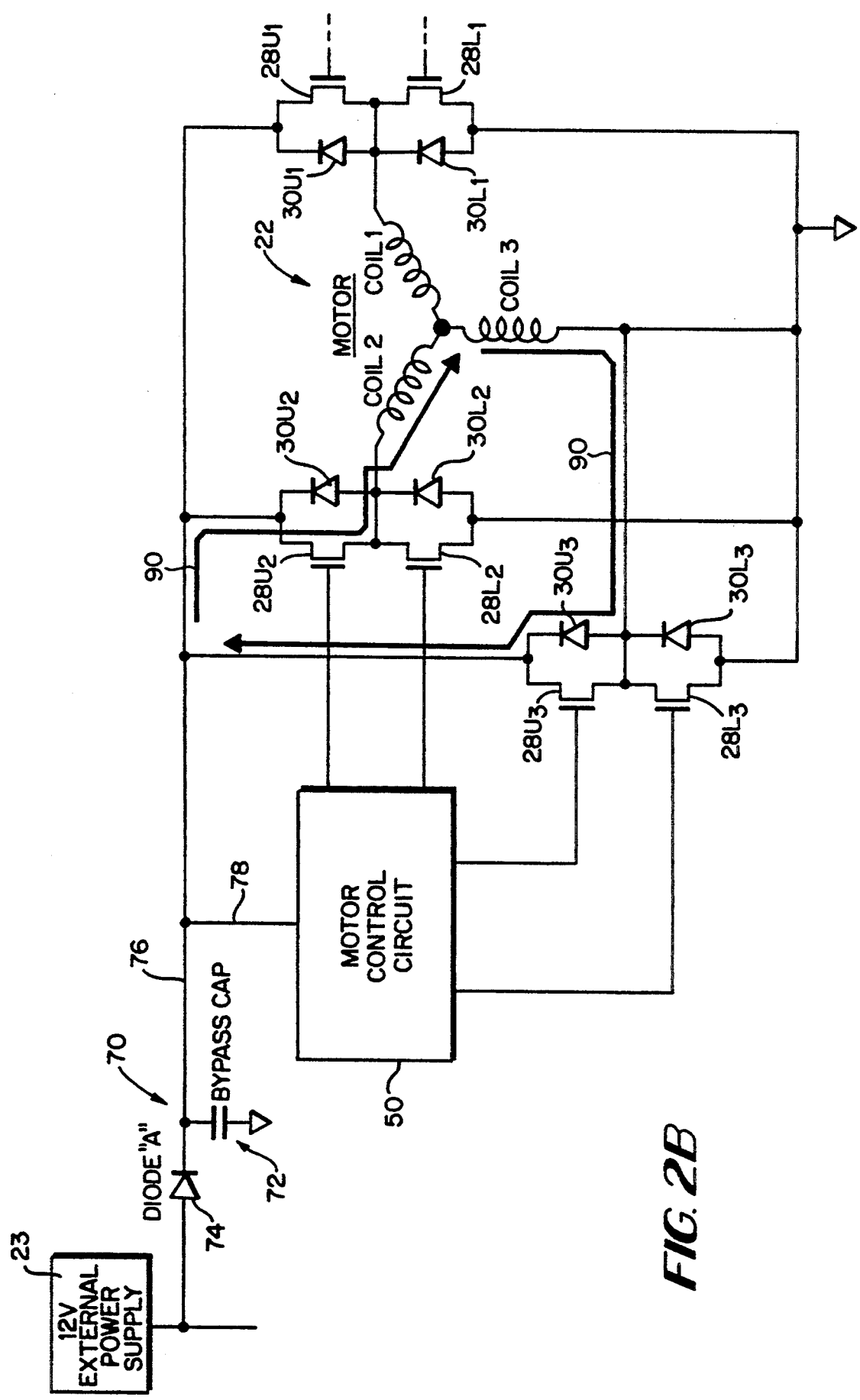
FIG. 2B is schematic view showing current decay in the deceleration control system of FIG. 1 during a normal operation mode.
Figure 2C:
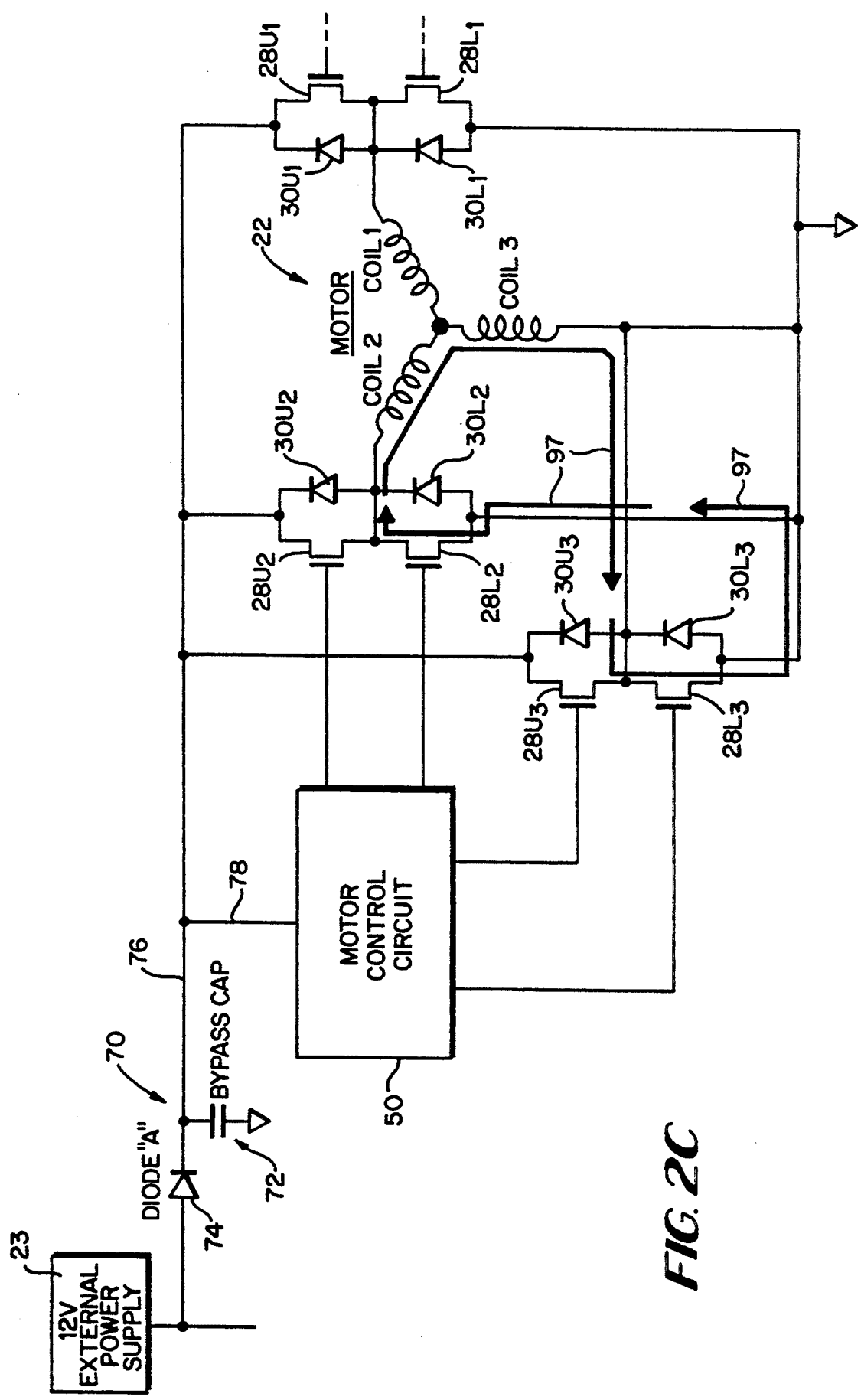
FIG. 2C is schematic view showing current build-up in the deceleration control system of FIG. 1 during a power-off operation mode.
Figure 2D:
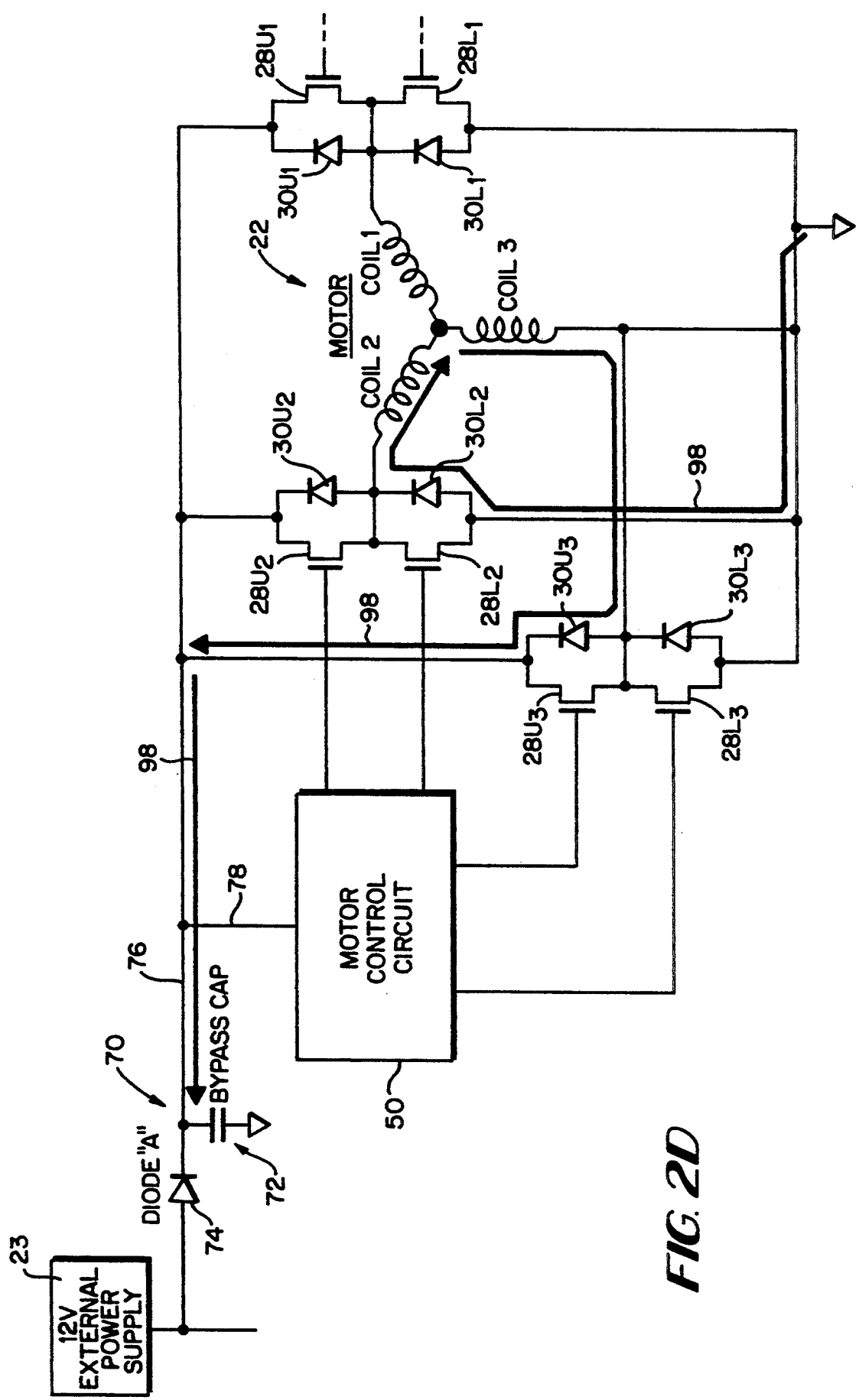
FIG. 2D is schematic view showing current decay in the deceleration control system of FIG. 1 during a power-off operation mode.
Figure 3:
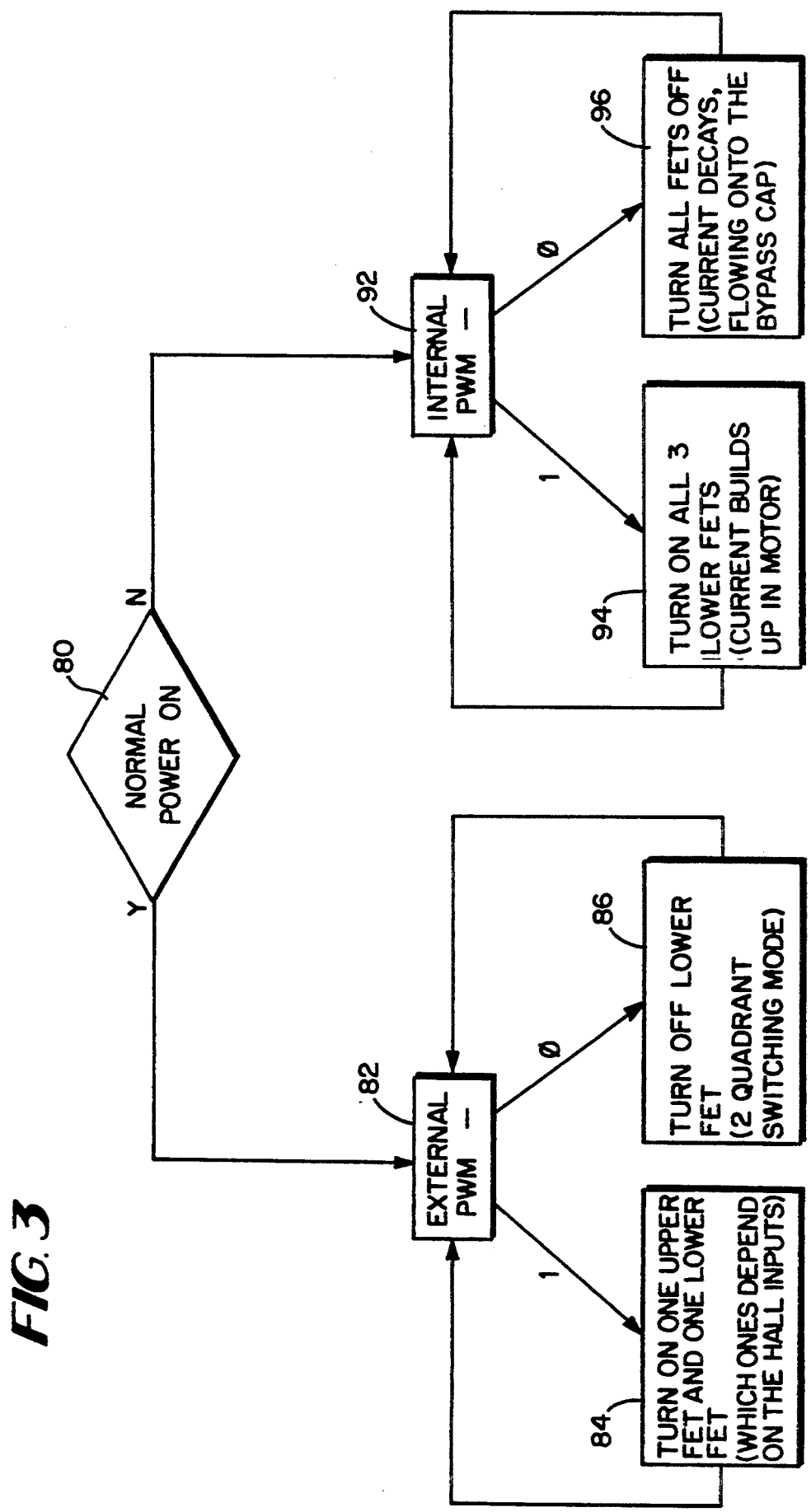
FIG. 3 is a schematic view illustrating steps involved in the operation of the deceleration control system of FIG. 1.

FIG. 2A–2D (in conjunction with FIG. 3) facilitate an understanding off the operation of the deceleration control system 20 of FIG. 1. FIG. 3 is a schematic view illustrating steps involved in the operation of the controller 52 of FIG. 1. All drawings refer to a two quadrant switching mode operation of motor 22. Although not specifically discussed herein, it should be understood that the invention also applies to normal four quadrant switching as well as a normal linear mode.

During a normal power-on condition, the 12 volt external power supply 23 supplies power through diode 74 to coil drive circuits 26 and to the motor control circuit 52. Power supply 23 also supplies power to microprocessor 40. During the normal power-on condition, motor circuit controller 52 controls switch 55 so that PWM line 46 is connected to the PWM input terminal of controller 52.

During the normal power-on condition, microprocessor 40 routinely makes two determinations. The first determination concerns how motor 22 should be driven at the present moment assuming normal operation continues. The second determination concerns how motor 22 should be driven to effect a controlled deceleration in the event that an abrupt power-off condition were to be immediately experienced. Thus, the second determination is somewhat a "last will and testament" of microprocessor 40 should power-off occur before microprocessor 40 has an opportunity to make any further determinations.

Both determinations of microprocessor 40 are based on currently prevailing operational parameters of the environment in which motor 22 operates. For example, when the motor 22 is used in connection with a reeled media handling device, the currently prevailing operational parameters taken into consideration by microprocessor 40 include reel angular velocity and media radius on the reel. Using the currently prevailing operational parameters, microprocessor 40 can separately make these two determinations either by a calculation on-the-fly, or by resort to a look-up table. In the later regard, FIG. 1 shows a memory 48 in which the currently prevailing operational parameters can serve for indexing to obtain an appropriate resultant value. Since the fields of application of system 20 are varied, and since there are numerous well-known ways of obtaining pertinent currently prevailing operational parameters for many of these fields, a detailed description thereof is deemed unnecessary.

The above-described determinations of microprocessor 40 are updated routinely as environmental operating parameters change. For example, in the environment of a reeled media handling device, the determinations must be updated as the speed and radius of a reel changes. For example, in the illustrated embodiment, the determination of the normal motor-governing PWM control signal is updated approximately every 1 millisecond and the determination of the contingent motor-governing deceleration signal is updated as often as every 100 milliseconds during a fast acceleration.

The second determination of microprocessor 40 (i.e., how motor 22 should be driven to effect a controlled deceleration in the event that an abrupt power-off condition were to be immediately experienced) results in a value (also known as the contingent motor-governing deceleration signal) that is output on serial line 44 to memory 54 of the motor control circuit 50. Usage of the contingent motor-governing deceleration signal will be described below in connection with the power-off condition.

The first determination of microprocessor 40 (i.e., how motor 22 should be driven at the present moment assuming normal operation continues) results in an output signal on PWM line 46. This output signal, also known as the normal motor-governing PWM control signal, is applied through switch 55 to controller 52 and advises controller 52 of the desired duty cycle of the motor 22.

FIG. 3 shows basic steps involved in the operation of controller 52 of motor control circuit 50. At step 80, controller 52 determines whether a normal power-on condition or a power-off condition is being experienced. In the context of the present discussion, it is assumed that a normal power-on condition exists. Accordingly, at step 82 controller 52 sets switch 50 so that the normal motor-governing PWM control signal (shown as "External PWM" in FIG. 3) is applied to controller 52.

Thus, controller 52 receives the normal motor-governing PWM control signal at its PWM input terminal. In conventional manner, the PWM signal is high ("1") during a portion of a cycle, and low ("0") during the remainder of the cycle. The PWM signal thus dictates, based on the determination of microprocessor 40, what percentage of time certain of the transistors 28 are "on" (e.g., conducting current).

Steps 84 and 86 of FIG. 3 illustrate how controller 52 and gate control circuitry 58 use the PWM signal to apply signals to gates of the transistors 28 for driving motor 22 in accordance with the determination of microprocessor 40 during the normal power-on mode. Exactly which transistors 28 are "on" when the PWM signal so indicates depends on the states of the three Hall signals from motor 22 (on line 62), in accordance with conventional practice.

As indicated by step 84, when the PWM signal is high ("1") the controller 52 and circuitry 58 turn on one upper transistor 28U and one lower transistor 28L (which ones depending on the Hall input signals). FIG. 2A shows current flow (depicted by arrows 88) for only one exemplary set of Hall inputs in a normal power-on condition (e.g., normal operation mode) when the normal motor-governing PWM control signal is high ("1"). The example of FIG. 2A shows that transistors $28U_2$ and $28L_3$ are conducting, no diodes 30 are conducting, and current is flowing from bypass capacitor 72.

As indicated by step 86, when the PWM signal is low ("0") the controller 52 and circuitry 58 turn off the lower transistor 28L so that its counterpart upper diode 28L is conducting. FIG. 2B shows current flow (depicted by arrows 90) for only one set of exemplary Hall inputs in a normal power-on condition (e.g., normal operation mode) when the normal motor-governing PWM control signal is low ("0"). FIG. 2B shows that transistor $28U_2$ and diode $30U_3$ are conducting, and current is decaying.

Again, it should be understood that FIGS. 2A and 2B illustrate current flow for only one exemplary set of Hall inputs, e.g., input affecting coil $24_2$, and that analogous current flows are periodically realized for the other coils $24_1$ and $24_3$ in accordance with the Hall inputs. In differing modes of operation (e.g., four quadrant mode or linear mode), differing patterns of transistor driving can be employed.

OPERATION: POWER-OFF MODE

Controller 52 is advised by the status of the signal on line 60 when power from power supply 23 is abruptly terminated. Thus, when a power-off determination is made at step 80 of FIG. 3 by controller 52, controller 52 issues a signal on switch control line 59 (step 92) for controlling actuation of switch 55 to receive the contingent motor-governing PWM output signal from PWM conversion circuit 56 (rather than the normal motor-governing PWM control signal on line 46). Indeed, as a result of the termination of power from power supply 23, microprocessor 40 is dead and there is no signal therefrom on line 46.

Like the normal motor-governing PWM control signal utilized in the normal power-on mode, the contingent motor-governing PWM output signal utilized in the power-off mode is a PWM signal which advises of the desired duty cycle of motor 22. However, the duty cycle prescribed by the contingent motor-governing PWM control signal was determined by microprocessor 40 under differing assumptions than the duty cycle prescribed by the normal motor-governing PWM control signal. In particular, as explained above, the duty cycle prescribed by the contingent motor-governing PWM control signal was based on the projected duty cycle necessary for controlled deceleration of motor 22 in the event that an abrupt power-off condition were to be experienced. The present discussion details performance of controller 52 when the last will and testament of microprocessor 40 is invoked during power-off.

Although microprocessor 40 is dead during a power-off condition, motor control circuit 50 and its controller 52 remain alive owing to the charge on bypass capacitor 72. Although not specifically shown in FIGS. 2A–2D, motor control circuit 50 continuously draws (on lines 76 and 78) a small amount of current from bypass capacitor 72. The charge on bypass capacitor 72 is periodically refreshed in the manner described below (particularly with reference to FIG. 2D). Operations of motor control circuit 50 and particularly controller 52 during the power-off mode are described below.

Steps 94 and 96 of FIG. 3 illustrate how controller 52 and gate control circuitry 58 use the PWM signal to apply signals to gates of the transistors 28 for driving motor 22 according to the last will and testament of microprocessor 40 in a power-off mode. In the power-off mode, signals from the Hall sensors on line 62 are ignored.

As indicated by step 94, when the PWM signal is high ("1") the controller 52 and circuitry 58 turn on all three lower transistors 28L and no diodes 30 are conducting. FIG. 2C shows current flow (depicted by arrows 97) in a power-off condition when the contingent motor-governing PWM control signal is high ("1"). Arrows 97 show current to be flowing in a circular path and motor 22 is slowing down. Due to the voltage normally generated by the rotating motor 22, current builds up in coils 24, flowing in the circular direction. This current (depicted by arrows 97) is associated with a torque that opposes the motion of motor 22, so FIG. 2C depicts a "braking" cycle.

As indicated by step 96, when the PWM signal is low ("0") the controller 52 and circuitry 58 turn off all transistors 28 so current decays and flows into bypass capacitor 72 as motor 22 continues to slow. FIG. 2D shows current flow (depicted by arrows 98) in a power-off condition when the contingent motor-governing PWM control signal is low ("0"). As shown in FIG. 2D, current flows through diodes $30L_2$ and $30U_3$ back to bypass capacitor 72. Due to the inductive nature of coils 24 of motor 22, current flows through diodes 30 back into the bypass capacitor 72. This replenishes the charge on bypass capacitor 72, providing energy to maintain power to motor control circuit 50. Current is blocked by diode 74 from flowing further upstream from capacitor 72. FIG. 2D thus depicts a "release" cycle.

As indicated above, motor control circuit 50 continuously draws a small amount of current from bypass capacitor 72 (via line 78). The magnitude of the current thus drawn by motor control circuit 50 is on the order of about one tenth that of the main current flows depicted by arrows 88, 90, 97, and 98 in FIGS. 2A–2D, respectively.

TAPE DRIVE EMBODIMENT

Figure 4:
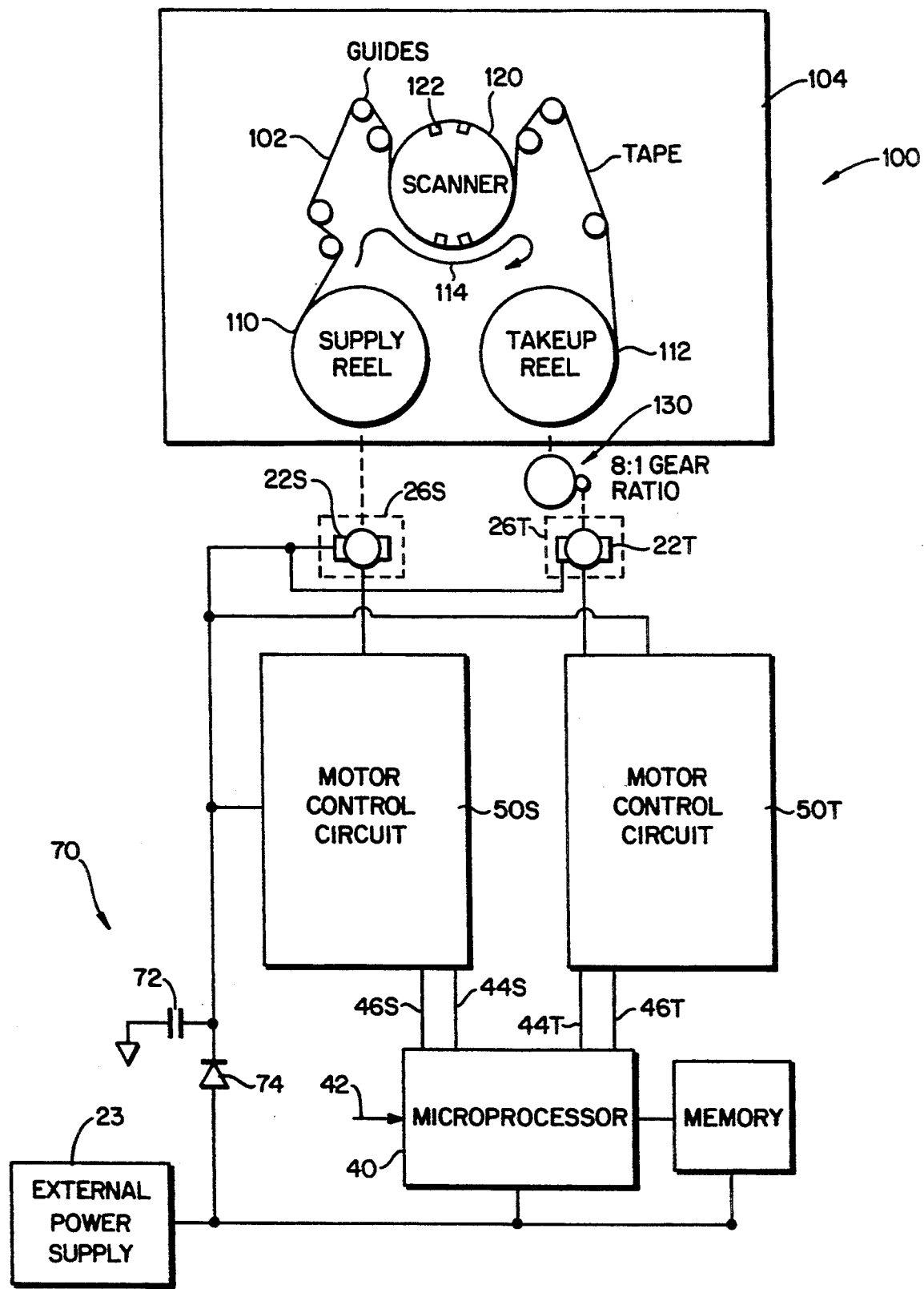
FIG. 4 is a schematic view showing employment of the deceleration control system of FIG. 1 in a tape drive system.

FIG. 4 shows implementation of the invention in a tape drive 100 for recording information signals on a magnetic tape 102 and for reproducing information signals from the tape 102. Unless otherwise specified, like numbered reference numerals utilized in FIG. 1 and FIG. 4 (although perhaps used with alphabetical suffixes in FIG. 4 to distinguish supply side and take-up side) refer to structure having essentially the same constituency and operation.

As shown in FIG. 4, tape drive 100 includes a floor or deck 104 upon which are mounted a supply reel 110 and a take-up reel 112. A first end of tape 102 is wound about supply reel 110; a second end of tape 102 is wound about take-up reel 112. A tape path 114 extends from supply reel 110 to take-up reel 112. Tape drive 100 further includes a drum or scanner 120 which includes one or more transducing heads 122 which are selectively in contact with a portion of tape 102 as scanner 120 rotates.

Tape drive 100 further comprises a motor 22S for causing rotation of supply reel 110 and motor 22T for causing rotation of take-up reel 112. A gearing arrangement 130 exists between take-up reel 112 and its motor 22T. This gearing arrangement is further described in simultaneously-filed U.S. patent application Ser. No. 08/150,730 of Miles and Zweighaft entitled "Capstanless Helical Drive System" (incorporated herein by reference). Utilization of one geared motor and one ungeared motor is deemed preferable, but not exclusive.

Motors 22S and 22T are schematically illustrated in FIG. 4 as having corresponding coil drive circuits 26S and 26T which are driven by respective motor control circuits 50S and 50T. Each of the coil drive circuits 26S, 26T is essentially the coil drive circuit 26 illustrated in FIG. 1. Likewise, motor control circuits 50S and 50T are each essentially the motor drive circuit 50 shown in FIG. 1.

FIG. 4 further illustrates that the motors 22S, 22T are connected to regenerative power supply 70. The structure and operation of regenerative power supply 70 is understood from regenerative power supply 70 discussed with reference to FIG. 1.

In the embodiment shown in FIG. 4, a single microprocessor 40 outputs differing signals to motor control circuit 50S and motor control circuit 50T. It should be understood that, in other embodiments, a separate microprocessor can be utilized for each motor drive circuit if desired. Moreover, microprocessor 40 of FIG. 4 receives on line 42 signals indicative of operating conditions of tape drive 100 pertinent to deceleration control of motors 22S and 22T. For example, signals on line 42 include signals indicative of reel velocity and tape radius on reels 110 and 112. Such signals can be obtained in numerous ways, including those heretofore well known in the art as well as the approach set forth in simultaneously-filed U.S. patent application Ser. No. 08/150,726 of Georgis and Zweighaft entitled "Method And Apparatus For Controlling Media Linear Speed In A Helical Scan Recorder" (incorporated herein by reference).

In preparing the respective contingent motor-governing control signal for motor control circuits 50S and 50T, microprocessor 40 determines PWM values for the respective signals such that the trailing reel tries to stop sooner than the leading reel. Which of the reels 110, 112 is the trailing and leading reel depends, of course, on the direction of tape travel (e.g., forward or reverse).

The, the deceleration control system 20 of the present invention facilitates, upon abrupt power loss, an orderly, intelligently-managed deceleration of motor 22. Advantageously, deceleration control system 20 of the present invention utilizes current produced by the decelerating motor to replenish charge to its regenerative power supply 70, which in turn keeps alive motor control circuit 50, which in turn implements (after death of microprocessor 40) a controlled deceleration willed by microprocessor 40. Deceleration control system 20 accomplishes its objectives without additional parts or mechanical elements.

While the invention has been particularly shown and described with reference to the preferred embodiments thereof, it will be understood by those skilled in the art that various alterations in form and detail may be made therein without departing from the spirit and scope of the invention. For example, although the coil drive circuits 26 have been shown as including FET transistors 28 with associated intrinsic diodes 30, other analogous components can be utilized in other embodiments. For example, bipolar transistors can also be employed if provided with external diodes to perform the function of the intrinsic diodes 30. The function of the coil drive circuits 26 can also be performed by commercial chips.

The embodiments of the invention in which an exclusive property or privilege is claimed are defined as follows:

1. Apparatus for controlling deceleration of a motor during an abrupt power-off condition of power from a primary power supply circuit, the apparatus comprising:
    a processor which is powered by the primary power supply circuit and which, during normal power-on operation and prior to the power-off condition routinely generates, on the basis of currently prevailing operation parameters, a motor-governing deceleration signal for use in governing the motor should the power-off condition occur;
    a memory for storing the motor-governing deceleration signal;
    a motor control circuit which, in response to the occurrence of a power-off condition, controls the motor in accordance with the motor-governing deceleration signal stored in the memory; and
    a secondary power supply circuit which provides power to the motor control circuit during the power-off condition.

2. The apparatus of claim 1, wherein the secondary power supply circuit is a regenerative power supply circuit which uses current from the decelerating motor to provide power to the motor control circuit during the power-off condition.

3. The apparatus of claim 2, wherein the motor is a brushless three phase DC motor.

4. The apparatus of claim 3, further comprising a coil drive circuit for each of three coils of the motor, the coil drive circuit comprising a pair of transistors and a pair of diodes.

5. The apparatus of claim 4, wherein the regenerative power supply circuit comprises the coil drive circuits and a bypass capacitor, the bypass capacitor being connected between a power supply and each coil drive circuit.

6. The apparatus of claim 1, wherein the motor-governing deceleration signal is a pulse width modulated signal.

7. The apparatus of claim 1, wherein the processor also generates a normal motor-governing control signal for governing the motor during normal power-on operation, and wherein the motor control circuit comprises
    a controller which, in accordance with whether a power-off or power-on condition is experienced, selects between (1) the normal condition motor-governing control signal and (2) the motor-governing deceleration signal.

8. The apparatus of claim 7, wherein the motor-governing deceleration signal and the normal condition motor-governing control signal are pulse width modulated signals.

9. The apparatus of claim 1, wherein the processor generates the motor-governing deceleration signal by consulting a look-up table stored in a table memory.

10. The apparatus of claim 1, wherein the processor generates the motor-governing deceleration signal by performing a calculation using currently prevailing operation parameters.

11. The apparatus of claim 1, wherein the motor is a motor for a tape reel in a tape drive.

12. The apparatus of claim 11, wherein the tape drive has both a tape supply reel and a tape take-up reel, and wherein for each reel there is provided a motor control circuit and a secondary power supply circuit.

13. The apparatus of claim 1, further comprising means for precluding transmission of power supplied from the secondary power supply circuit to the processor, so that execution of the processor terminates during the off-power condition.

14. A magnetic tape drive for recording information signals on the tape and for reproducing information signals from the tape, the apparatus comprising:
    a primary power supply circuit;
    a supply reel upon which a first end of the tape is wound;
    a take-up reel upon which a second end of the tape is wound;
    a tape path extending from the supply reel to the take-up reel;
    a head on the tape path, the head being in at least periodic contact with a portion of the tape;
    a motor for causing rotation of at least one of the supply reel and the take-up reel;
    a processor which is powered by the primary power supply circuit and which, during normal power-on operation and prior to the power-off condition routinely generates, on the basis of currently prevailing operation parameters, a motor-governing deceleration signal for use in governing the motor should the power-off condition occur;

a memory for storing the motor-governing deceleration signal;

a motor control circuit which, in response to the occurrence of a power-off condition, controls the motor in accordance with the motor-governing deceleration signal stored in the memory; and a secondary power supply circuit which provides power to the motor control circuit during the power-off condition.

15. The apparatus of claim 14, wherein the secondary power supply circuit is a regenerative power supply circuit which uses current from the decelerating motor to provide power to the motor control circuit during the power-off condition.

16. The apparatus of claim 15, wherein the motor is a brushless three phase DC motor.

17. The apparatus of claim 16, further comprising a coil drive circuit for each of three coils of the motor, the coil drive circuit comprising a pair of transistors and a pair of diodes.

18. The apparatus of claim 17, wherein the regenerative power supply circuit comprises the coil drive circuits and a bypass capacitor, the bypass capacitor being connected between a power supply and each coil drive circuit.

19. The apparatus of claim 14, wherein the motor-governing deceleration signal is a pulse width modulated signal.

20. The apparatus of claim 14, wherein the processor also generates a normal motor-governing control signal for governing the motor during normal power-on operation, and wherein the motor control circuit comprises a controller which, in accordance with whether a power-off or power-on condition is experienced, selects between (1) the normal condition motor-governing control signal and (2) the motor-governing deceleration signal.

21. The apparatus of claim 20, wherein the motor-governing deceleration signal and the normal condition motor-governing control signal are pulse width modulated signals.

22. The apparatus of claim 14, wherein the processor generates the motor-governing deceleration signal by consulting a look-up table stored in a table memory.

23. The apparatus of claim 1, wherein the processor generates the motor-governing deceleration signal by performing a calculation using currently prevailing operation parameters.

24. The apparatus of claim 14, wherein motors are provided for causing rotation of each of the supply reel and the take-up reel, and wherein for both reels there is provided a motor control circuit and a secondary power supply circuit.

25. The apparatus of claim 14, further comprising means for precluding transmission of power supplied from the secondary power supply circuit to the processor, so that execution of the processor terminates during the off-power condition.

26. A method for controlling deceleration of a motor during an abrupt power-off condition, the method comprising:

routinely generating, on the basis of power supplied by a primary power supply circuit and during normal power-on operation and prior to the power-off condition and based on currently prevailing operation parameters, a motor-governing deceleration signal for use in governing the motor should the power-off condition occur;

storing the motor-governing deceleration signal in a memory;

controlling the motor, in response to the occurrence of the power-off condition, in accordance with the motor-governing deceleration signal stored in the memory; and providing power to the motor control circuit during the power-off condition using a secondary power supply circuit.

27. The method of claim 26, wherein the step of providing power to the motor control circuit includes using current from the decelerating motor.

28. The method of claim 27, wherein the motor is a brushless three phase DC motor having a coil drive circuit for each of three coils of the motor, and wherein charged is stored during the power-off condition in a capacitor connected between a power supply and each coil drive circuit.

29. The method of claim 26, wherein the motor-governing deceleration signal is a pulse width modulated signal.

30. The method of claim 26, further comprising:

generating a normal motor-governing control signal for governing the motor during normal power-on operation; and selecting, in accordance with whether a power-off or power-on condition is experienced, between (1) the normal condition motor-governing control signal and (2) the motor-governing deceleration signal.

31. The method of claim 30, wherein the motor-governing deceleration signal and the normal condition motor-governing control signal are pulse width modulated signals.

32. The method of claim 26, wherein the step of generating the motor-governing deceleration signal involves consulting a look-up table stored in a table memory.

33. The method of claim 26, wherein the step of generating the motor-governing deceleration signal involves performing a calculation using currently prevailing operation parameters.

34. The method of claim 26, wherein the motor is a motor for a tape reel in a tape drive.

35. A method for operating a tape drive, the method comprising:

transporting tape from a supply reel and past a transducing head to a take-up reel at least in part by using a motor for causing rotation of at least one of the supply reel and the take-up reel;

routinely generating, on the basis of power supplied by a primary power supply circuit and during normal power-on operation and prior to the power-off condition and based on currently prevailing operation parameters, a motor-governing deceleration signal for use in governing the motor should the power-off condition occur;

storing the motor-governing deceleration signal in a memory;

controlling the motor, in response to the occurrence of the power-off condition, in accordance with the motor-governing deceleration signal stored in the memory; and providing power to the motor control circuit during the power-off condition using a secondary power supply circuit.

36. The method of claim 35, wherein the step of providing power to the motor control circuit includes using current from the decelerating motor.

37. The method of claim 36, wherein the motor is a brushless three phase DC motor having a coil drive circuit for each of three coils of the motor, and wherein charged is stored during the power-off condition in a capacitor connected between a power supply and each coil drive circuit.

38. The method of claim 37, wherein the motor-governing deceleration signal is a pulse width modulated signal.

39. The method of claim 35, further comprising:
generating a normal motor-governing control signal for governing the motor during normal power-on operation; and
selecting, in accordance with whether a power-off or power-on condition is experienced, between (1) the normal condition motor-governing control signal and (2) the motor-governing deceleration signal.

40. The method of claim 35 wherein the motor-governing deceleration signal and the normal condition motor-governing control signal are pulse width modulated signals.

41. The method of claim 35, wherein the step of generating the motor-governing deceleration signal involves consulting a look-up table stored in a table memory.

42. The method of claim 35, wherein the step of generating the motor-governing deceleration signal involves performing a calculation using currently prevailing operation parameters.

43. A method for controlling deceleration of a motor during an abrupt power-off condition, the method comprising:
using a processor to routinely generate, on the basis of power supplied by a primary power supply circuit and during normal power-on operation and prior to the power-off condition and based on currently prevailing operation parameters, a motor-governing deceleration signal for use in governing the motor should the power-off condition occur;
storing the motor-governing deceleration signal in a memory;
controlling the motor, in response to the occurrence of the power-off condition, in accordance with the motor-governing deceleration signal stored in the memory;
providing power to the motor control circuit but not to the processor during the power-off condition using a secondary power supply circuit.

* * * * *